No. 749,126. PATENTED JAN. 5, 1904.
F. W. BREHM.
PHOTOGRAPHIC CAMERA.
APPLICATION FILED OCT. 6, 1902.
NO MODEL.
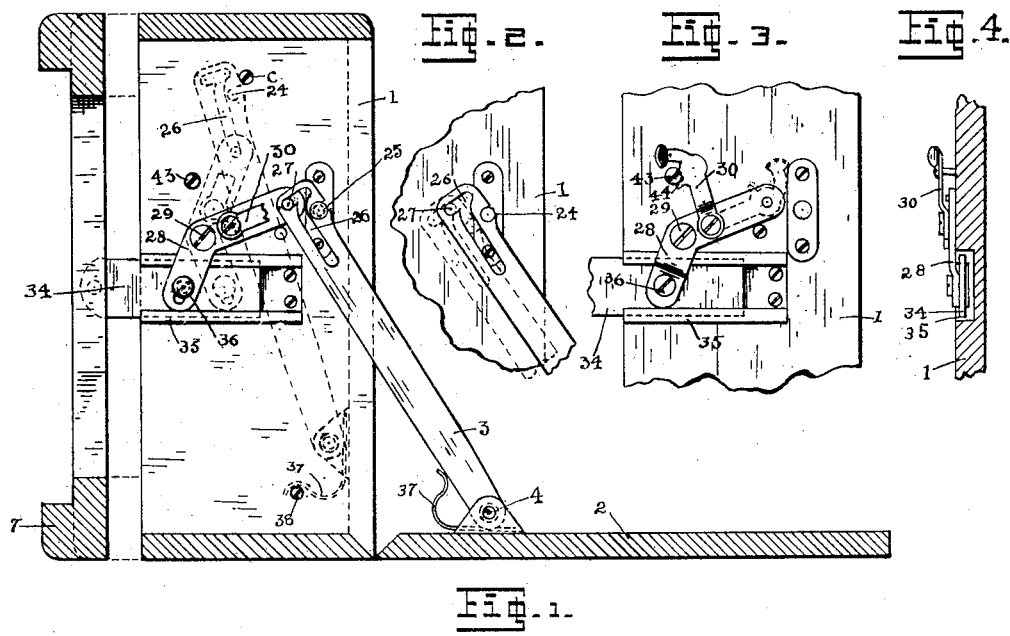
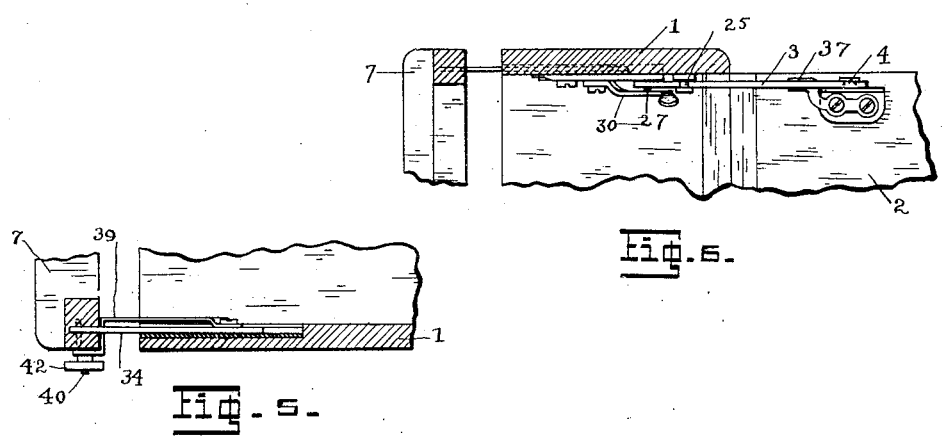
WITNESSES: Frederick W. Brehm. INVENTOR.
BY
ATTORNEY.

No. 749,126. Patented January 5, 1904.

UNITED STATES PATENT OFFICE.

FREDERICK W. BREHM, OF ROCHESTER, NEW YORK, ASSIGNOR TO GUNDLACH OPTICAL COMPANY, OF ROCHESTER, NEW YORK, A CORPORATION.

PHOTOGRAPHIC CAMERA.

SPECIFICATION forming part of Letters Patent No. 749,126, dated January 5, 1904.

Original application filed October 18, 1901, Serial No. 79,088. Divided and this application filed October 6, 1902. Serial No. 126,035. (No model.)

*To all whom it may concern:*

Be it known that I, FREDERICK W. BREHM, a citizen of the United States, residing at Rochester, in the county of Monroe and State of New York, have invented a new and useful Improvement in Photographic Cameras, of which the following is a specification.

My invention relates to improvements in cameras, this application being a division of my prior application, filed October 18, 1901, Serial No. 79,088.

The object of the invention is the production of a camera that is adapted to be used with almost all kinds of lenses and that is very compact in construction. This object I attain in the camera that is shown in the accompanying drawings, in which—

Figure 1 is a section through a camera, showing in full lines the position of the parts when the front door is opened and in dotted lines the position of these parts when the door is closed. Fig. 2 is a view showing two positions of the door-brace. Fig. 3 is a view showing the means for locking the slide when the door-brace is dropped down while using a wide-angle lens and also showing the double use of the locking-lever. Fig. 4 is a view of a portion of the mechanism shown in Fig. 6 as seen from the right. Fig. 5 is a plan view of the swing-back link and slide, showing in section the parts to which they are connected; and Fig. 6 is a plan view of the parts shown in Fig. 1, the same being partially in section.

In the manufacture of a camera for general use it is necessary if good results are to be secured that the camera have a swing-back. Heretofore the swing-back or bellows-frame has been placed far enough to the rear of the camera-box to permit it to be swung, thus occupying considerable extra space when the camera is folded, or the body of the camera has been made large enough to surround the back and allow it to swing inside, thereby very much increasing the size of the box. In my invention the swing-back closes against the rear of the box or body proper when the front is closed, but automatically moves back therefrom as the front is dropped, in which position it may be swung as desired. This part of my invention renders my camera very compact without destroying the swing-back feature, which is essential to good photographic work.

In the drawings, in which similar reference characters designate corresponding parts in all the views, 1 represents the camera box or body, to the lower front edge of which is pivoted the door 2. The door is supported when lowered by the braces 3, which are pivoted thereto at one end, as shown at 4, and are secured at their other ends to the inner sides of the box by means hereinafter described.

6 designates the movable front which carries the lens, (not shown,) and 7 the swing-back or bellows-frame.

The braces 3 are provided near their upper ends with notches 24, which engage with pins, lugs, or projections 25 on the box when the door 2 is open, as shown in Fig. 1. These braces also have slots 26 near their upper ends, into which project pins 27, which are carried by bell-cranks 28, the bell-cranks being pivoted to the inner sides of the box 1 at 29. The function of these bell-cranks and their pin-and-slot connections with the braces 3 will be hereinafter stated. The braces are held against the bell-cranks and in position for engagement with the pins 25 by means of locking-levers 30, which are pivoted to the bell-cranks and press against the ends of the pins 27, as shown in Fig. 9. These locking-levers are adapted to be turned upwardly, as shown in Fig. 6, when the braces 3 may be disengaged from the pins 25 and 27 and the door may be dropped.

As is well known, a camera is often required to be used under conditions where a swing-back becomes essential if one is to secure good results. As has been previously stated, this feature has always necessitated a larger box. In my camera, however, the swing-back closes against the rear of the box when the door is closed, but automatically moves away therefrom and parallel thereto when the door is opened. This result is effected by pivoting the back 7 at each side and substantially at its center to slides 34, which move back and forth in the ways 35, which are preferably sunk into the inner sides of the box. The slides are moved by means of the bell-cranks 28, with which they are connected by means of pins or screws 36 on the slides, which project through slots in the lower ends of the bell-cranks. As has been described, the bell-cranks are loosely connected with and are operated by the braces 3 when the door 2 is opened and shut. When the door is closed, these parts take the position illustrated in dotted lines in Fig. 1, where the lower part of the slot 26 in the link 3 is shown as having engaged the pin 27 and forced the bell-crank to rotate about its pivot 29 to draw the slide 34 and the swing-back inwardly. When the door is opened, the pin 27 passes through the slot without changing the position of the swing-back until it engages with the upper end thereof, when the bell-crank will be rotated to push the swing-back outwardly. By this means lost motion is provided between these parts and the swing-back is moved only when the door or bed is approaching the limit of its movements. Just before the door closes the upper end of the link 3 engages with a stationary pin c on the box 1, which will prevent it from moving forward. Thereafter the link will become a lever of the second class, and the inward movement of the lower end will positively draw the swing-back forward into contact with the box. It will be noticed that the slot 26 is shaped somewhat like the figure "7," in the upper part of which the pin 27 becomes caught, so that the slides 34 cannot be moved. The upper ends of the braces 3 are forced outwardly to lock the slides, as described, and also to engage the notches 24 with the pins 25 by springs 37, which are arranged on the door and bear against the braces near their lower ends. These springs also occupy such a position and are so shaped that when the door is closed they bear against pins or screws 38 inside the box 1, and thus force the door partly open when it is released.

In order to make the swing-back move parallel with itself and also to hold it in any position to which it may be swung, I pivot a link 39 to one of the slides 34 and secure its opposite end to the back by means of a screw 40, which projects through a slot 41 in the link. The back is locked by means of a thumb-nut 42 on the screw.

It is sometimes desirable to remove the door 2 from in front of the camera, as when a wide-angled lens is employed, in which case it is necessary to detach the braces 3 from the bell-cranks 28. This can be done by simply turning the locking-levers 30 away from the pins 27 and the upper ends of the braces. When the parts are thus detached, however, it would be possible to move the swing-back in and out, and in so doing the camera would be thrown out of focus. To prevent the movement of the swing-back at such times, the locking-levers 30 are turned into the position shown in Fig. 3, so that they will engage with stationary pins or screws 43, the levers being provided with lugs 44 for this purpose.

Having thus described my invention, what I claim as new, and desire to secure by Letters Patent, is—

1. In a camera, a box or body, a bed or door closing the front of the box, a bellows-frame, and connections between the bed or door and the bellows-frame whereby the latter is automatically moved by the movement of the door.

2. In a camera, a box or body, a bed or door closing the front of the box, a bellows-frame normally closed against the rear of the box, and connections between the bed or door and the bellows-frame whereby the latter is automatically moved away from the box by the opening movement of the door.

3. In a camera, a swing-back which is normally held against swinging movement, a movable bed for the camera, and means connecting the swing-back and the bed whereby the former is automatically released as the bed is brought into operative position.

4. In a camera, a box or body, a bed or door closing the front of the box, slideways on the inner sides of said body, a swing-back, slides secured to said swing-back and projecting into the slideways, and means connected with the door for moving the slides inwardly when the camera is closed, and outwardly when the camera is opened.

5. In a camera, a box or body, a bed closing the front of the box but adapted to swing at substantially a right angle thereto, braces for supporting the bed when swung, slideways on the inner sides of the box, slides mounted in said ways, a swing-back pivoted to said slides, and bell-cranks pivoted to the box and having their ends joined to the slides and the braces, for the purpose specified.

6. In a camera, a box or body, a bed closing the front of the box but adapted to swing at substantially a right angle thereto, braces for supporting the bed when thus swung, said braces having slots in their upper ends, slideways on the inner sides of the box, slides mounted in said ways, a swing-back pivoted to said slides, bell-cranks pivoted to the box and having one of their ends pivoted to the slides, and lugs on the other ends of the bell-cranks, said lugs entering the slots in the braces, for the purpose specified.

7. In a camera, a box or body, slideways on the inner sides of said box, a swing-back normally closed against the back of the box, slides pivotally secured to said swing-back and projecting into the slideways, a link connected to one of said slides, a slot-and-pin connection between said link and the swing-back for the purpose described, and means for moving the slides in the slideways.

8. In a camera, a box or body, a bed for normally closing said box but which is adapted to swing at substantially a right angle thereto, braces for holding said bed when thus swung, slides mounted for movement upon the inner sides of said box, a swing-back pivotally secured to said slides, bell-cranks pivoted to the box and jointedly secured to the slides, connections between the bell-cranks and the braces for the bed, whereby the bell-cranks are rocked when the bed is swung, locking-levers pivoted to the bell-cranks for holding the latter and the braces in engagement, said levers being capable of swinging on their pivots to free the braces from the bell-cranks so that the bed may be dropped, and pins or screws projecting from the box with which the levers engage to lock the swing-back, for the purpose described.

9. In a camera, a bellows, a folding bed, and means whereby the opening movement of the bed in one direction results in extending the bellows in the opposite direction.

10. In a camera, a box or body, a bellows-frame that is normally closed against the box, a door or bed for the box, connections between said door and bellows-frame whereby the latter is moved back from the box as the door opens, means for disconnecting the said connections so that the door may be dropped from in front of the box, a supplemental bed for insertion in the camera, and means for locking the bellows-frame in its position back of the box.

11. In a camera, a box or body, a bed or door for closing said box, a spring carried by said bed, a stationary piece projecting from the box against which said spring presses to throw open the bed or door, a brace for holding the bed when open, said brace having a notch, and a pin on the box with which said notch engages, the spring and the brace being so placed on the bed that when the latter is opened the brace will be pressed against the pin to cause the notch to engage therewith.

In testimony whereof I affix my signature in the presence of two witnesses.

FREDERICK W. BREHM.

Witnesses:
 EVA GOODMAN,
 ISAAC ADLER.